No. 724,609. PATENTED APR. 7, 1903.
F. M. PETERS.
CRACKER OR BISCUIT MACHINE.
APPLICATION FILED NOV. 16, 1901.
NO MODEL. 3 SHEETS—SHEET 1.
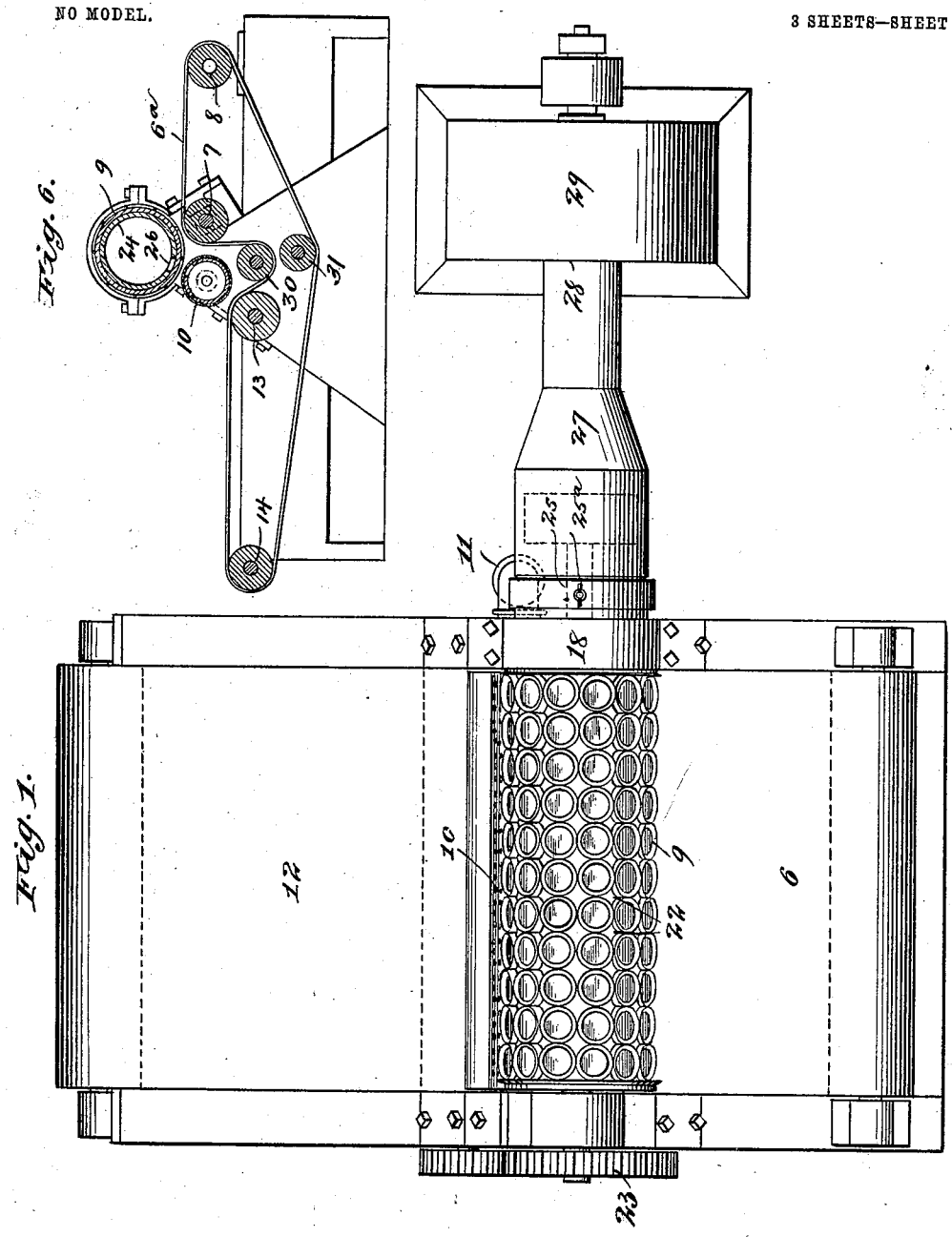
Witnesses.
Inventor,
Frank M. Peters,
By Offield, Towle & Linthicum
Attys.

No. 724,609. PATENTED APR. 7, 1903.
F. M. PETERS.
CRACKER OR BISCUIT MACHINE.
APPLICATION FILED NOV. 16, 1901.
NO MODEL. 3 SHEETS—SHEET 2.
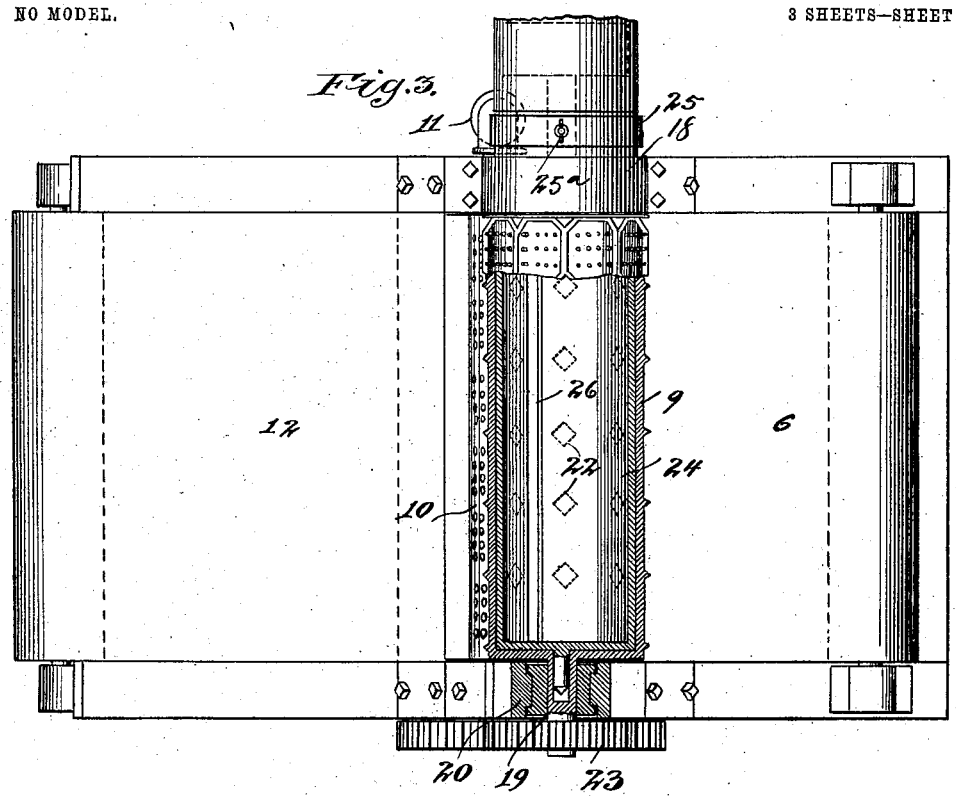
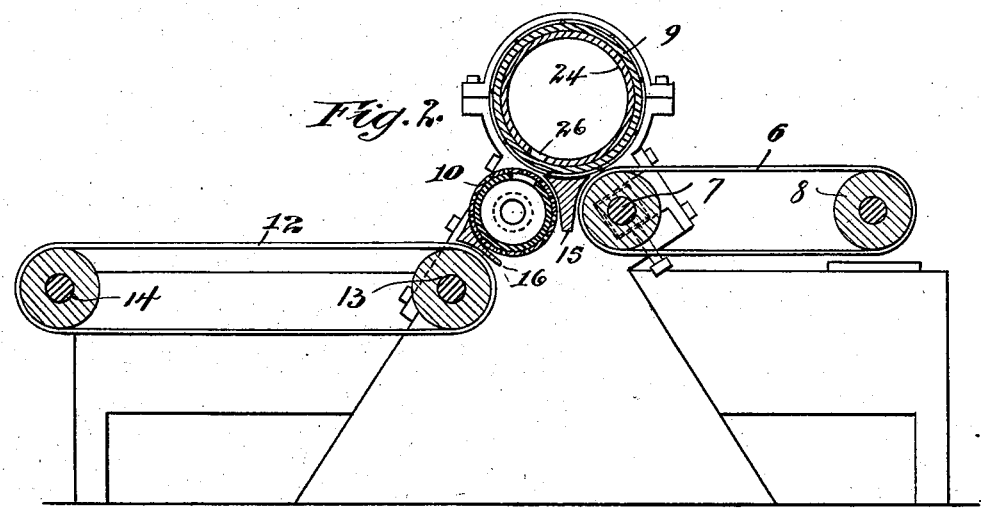
Witnesses: Inventor,
Frank M. Peters,
By Offield, Towle & Linthicum
Attys.

No. 724,609. PATENTED APR. 7, 1903.
F. M. PETERS.
CRACKER OR BISCUIT MACHINE.
APPLICATION FILED NOV. 16, 1901.
NO MODEL. 3 SHEETS—SHEET 3.
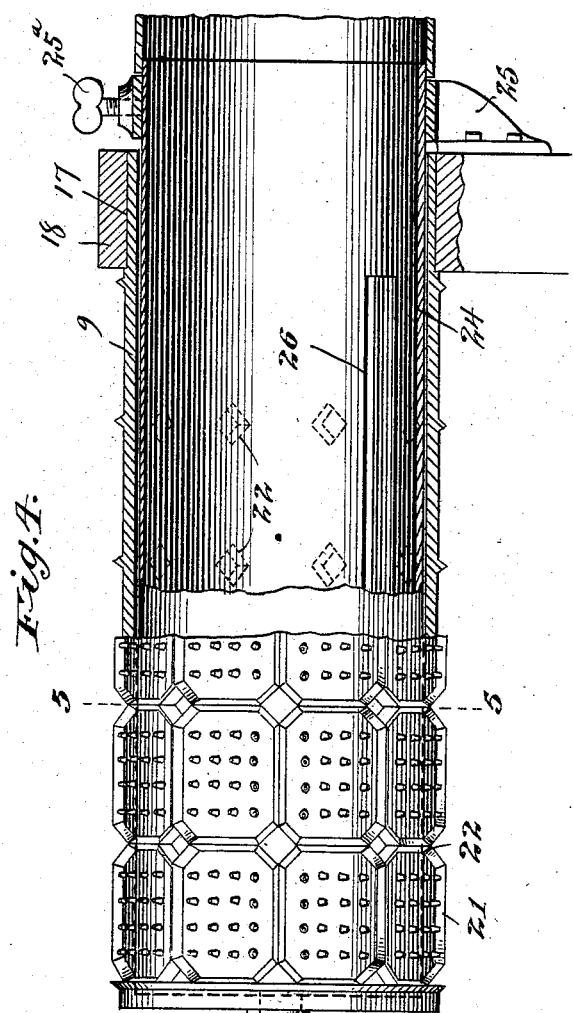
Witnesses,
Inventor,
Frank M. Peters.
By Offield, Towle & Linthicum
Attys.

UNITED STATES PATENT OFFICE.

FRANK M. PETERS, OF CHICAGO, ILLINOIS.

CRACKER OR BISCUIT MACHINE.

SPECIFICATION forming part of Letters Patent No. 724,609, dated April 7, 1903.

Application filed November 16, 1901. Serial No. 82,588. (No model.)

*To all whom it may concern:*

Be it known that I, FRANK M. PETERS, a citizen of the United States, residing at Chicago, in the county of Cook and State of Illinois, have invented certain new and useful Improvements in Cracker or Biscuit Machines, of which the following is a specification.

This invention relates primarily to machines for cutting or molding crackers or biscuit from dough by means of a cutter of the rotary type in which the scrap or excess is to be removed from such cutter, although the operative principle of my invention is capable of useful application in other arts, as will hereinafter appear.

My present invention is intended as an improvement in removing scrap from a cutting or molding cylinder; and in carrying out this improvement I have employed an air-suction mechanism designed to seize upon the particles of scrap as soon as said scrap has been fully severed from the sheet of dough or other material operated upon and in a rapid and positive manner withdraw the same from the cylinder.

To this and other ends my invention consists in certain novel features, which I will now proceed to describe and will then particularly point out in the appended claims.

My invention, in one embodiment and application thereof, is illustrated in the accompanying drawings, in which—

Figure 1 is a plan view of a cracker or biscuit cutting machine having my present improvements applied thereto. Fig. 2 is a vertical transverse section of the same. Fig. 3 is a plan view of the parts shown in Fig 2, a portion of the cutting-cylinder being broken away to disclose the interior mechanism. Fig. 4 is an elevation, partly in central transverse section, of the cutting-cylinder and the fixed slotted cylinder contained therein, which controls the application of the air-suction to the dough scrap. Fig. 5 is a transverse sectional view of a cutter-cylinder and its contents, such as is shown in Fig. 4, taken on a line passing centrally through a series of scrap-removing apertures; and Fig. 6 illustrates a modification of the dough-conveyer, showing a single endless apron for this purpose.

The machine shown in Figs. 1, 2, and 3, in which my present improvements are incorporated, comprises an endless belt or apron 6, passing around rollers 7 and 8 and serving to present the dough to the cutting-cylinder 9. In conjunction with the latter cylinder there operates a stripping mechanism consisting of an air-suction cylinder 10, adapted to be exhausted in one end through a pipe 11, a discharging-belt 12, passing over rollers 13 and 14, as well as a supporting-plate 15 between the belt 6 and the stripping-cylinder 10, and a stripping-plate 16 between the latter and the discharge-belt 12. One end of the cutting-cylinder 9 is formed externally into a bearing-surface or journal 17, which fits within a suitably divided bearing or box 18. At its other end the cutting-cylinder is provided with an extended journal 19, which fits within a divided bearing or box 20, so that the cutting-cylinder may be readily removed and replaced. The machine is thus adapted to receive any one of a number of cylinders having different patterns and sizes of cutters thereon.

In Fig. 1 I have shown a cylinder adapted for cutting crackers which are circular in form, while in Figs. 3 and 4 I have shown a cutting-cylinder adapted for cutting octagonal crackers. In each case the cutters proper consist of radially-projecting knife-edges 21, having the form of the outline of the cracker or biscuit to be cut, and in the case of the crackers having straight sides, as in Figs. 3 and 4, one portion or section of each knife-edge is common to two adjacent molds or cutters. Between each group of four cutters is formed an aperture 22, extending entirely through the wall of the cylinder, so that the scrap or waste may pass through said apertures into the interior of the cylinder. In order to provide for an easy clearance of the scrap in these apertures, the latter are preferably made of increasing diameter inward. It will thus be readily understood that as the cutting-cylinder revolves the cutters will cut out the biscuit in the desired shape against the solid or imperforate portions of the cylinder, while the remaining portion of the dough, which constitutes the scrap, will pass through the apertures 22 into the interior of the cylinder.

The cutting-cylinder is driven in any suitable manner—as, for instance, by means of a gear 23, secured on the journal 19 and driven by a train of gearing or by any other suitable means.

Referring now more particularly to the mechanism constituting the subject-matter of my present improvements, 24 designates a fixed hollow cylinder located within the cutter-cylinder 9, which cylinder may be adjustably supported at its outwardly-extending end by a suitable bracket 25 and set-screw 25ª or otherwise. This cylinder 24 snugly fits the interior of the cutter-cylinder 9, yet with entire freedom for the latter to rotate around the fixed cylinder without undue friction thereon. The cylinder 24 is provided with a longitudinal slot 26 coextensive in point of length with the cutting-surface of the outer cylinder 9 and arranged to extend parallel with the several longitudinal rows of apertures 22, formed through the shell of the outer or cutter cylinder. In the illustration of the invention herein shown these longitudinal rows of apertures extend parallel with the axis of the cylinder, and hence the slot 26 is also formed parallel with the axis of the cylinder. It will be readily understood that the individual cutters of the cylinder might be so arranged thereon as to bring the longitudinal rows of apertures into an oblique or diagonal disposition relatively to the surface of the cylinder, in which case the slot 26 would preferably be given a corresponding inclination with reference to the wall of its cylinder 24. This latter relative arrangement of the slot 26 and the longitudinal rows of apertures of the cutter-cylinder, while preferable, is not essential to the carrying out of my invention.

The inner or left-hand end of either the outer cylinder 9 or the inner cylinder 24 (preferably the former) is closed, and to the outer end of the cylinder 24, which projects beyond the bearing end of the cutter-cylinder 9, is secured a discharge-pipe 27, which leads to the inlet side 28 of a suction-blower, (indicated at 29,) whereby a strong and constant exhaust of air may be maintained within the cylinder 24.

From the foregoing construction it will be seen that the revolution of the outer cutter-cylinder 9 will successively uncover and expose to the action of the suction-blast the scrap-openings 22, lying between the cutters in the same longitudinal rows, the effect of which will be that the dough scrap contained within these apertures will be instantly drawn into the cylinder and thence carried by the suction-blast to a suitable point of discharge outside the machine. As shown in Fig. 2, the inner cylinder 24 will preferably be so positioned relatively to the outer cylinder 9 as to locate the slot 26 thereof opposite a point of revolution of the cylinder 9 substantially coincident with the point at which the already cut and impressed sheet of dough constituting the cracker stock is stripped from the cutting-cylinder by the stripping-cylinder 10 and passed thence onto the discharge-apron 12. This arrangement, while not an essential feature of my invention, is nevertheless preferable for the reason that the dough scrap is instantly withdrawn as soon as it is fairly cut from the dough sheet, and hence is not idly and uselessly carried around by the cylinder 9 in its rotation.

In Fig. 6 I have illustrated a slightly-different organization of machine to which my improvements are applicable. In this machine, instead of using separate feed and discharge aprons 6 and 12, Fig. 2, I may employ a single endless apron 6ª performing both functions, in connection with which I interpose a pair of idler or guide rollers 30 and 31, engaging the upper and under sections of the apron, respectively. In this connection I have also omitted the supporting and stripping plates 15 and 16 shown in Fig. 2, as the employment of these devices is entirely optional.

From the foregoing description of my invention and its manner of operation it will be evident that the useful character and capability of the device are not limited to any precise location or arrangement of the apertures of the cutting-cylinder, or of the slot of the inner stationary cylinder, or to the exact relative arrangement of the apertures and the slot, as herein shown and described; but the same may be considerably varied to adapt the device to cylinders having differently-disposed cutters, or to effect the withdrawal of the scrap later in the rotation of the cutter-cylinder or from the individual apertures successively rather than from individual rows or series of apertures without departing from the spirit of the invention; and although I have described my invention in connection with the cutting of dough in a cracker or biscuit machine, yet it will be understood that it is equally applicable and useful in connection with the cutting or molding of any other plastic material whatever and for any purpose whatever—as, for instance, the cutting of tile from sheets of plastic clay and the like. I do not, therefore, limit myself to the precise details of construction and relative arrangement of parts herein shown and described, nor to any particular material or use in connection with which my invention is to be employed.

I claim—

1. The combination with a rotatable cutting-cylinder having perforations leading to its interior for the removal of scrap, of an internal cylinder having a port or opening adapted to register with the scrap-perforations when the cutting-cylinder is rotated and means for exhausting the interior of said internal cylinder to withdraw the scrap, substantially as described.

2. In a machine of the character described, the combination with a rotary cutting-cylinder provided on its outer surface with cutters to operate on a sheet of plastic material, of a fixed cylinder telescoping said cutting-cylinder, and means for applying an air-suction to said fixed cylinder, substantially as described.

3. In a machine of the character described, the combination with a hollow rotary cutting-cylinder provided on its exterior with cutters to operate upon a sheet of plastic material and having apertures between the cutters, of a fixed cylinder disposed within said cutting-cylinder and having an opening through its shell through which the apertures of the cutting-cylinder are successively exposed to the interior of the fixed cylinder, and means for creating an air-suction within said latter cylinder, substantially as described.

4. In a cracker or biscuit cutting machine, the combination with a hollow rotary cutting-cylinder provided on its exterior with cutters to form the crackers or biscuit from a sheet of dough and having apertures between the cutters through which the scrap may pass into the interior of the cylinder, of a fixed cylinder lying within and slidingly engaging the inner surface of the cutting-cylinder, said fixed cylinder having a longitudinal slot formed through its shell which, by the rotation of the outer cutting-cylinder is brought into registration with successive longitudinal rows of apertures in said cutting-cylinder, and an air-suction device connected with the discharge end of said fixed cylinder, substantially as described.

5. In a cracker or biscuit cutting machine, the combination with a hollow rotary cutting-cylinder provided on its exterior with longitudinal rows of cutters to form the crackers or biscuit from a sheet of dough and having corresponding longitudinal rows of apertures between the cutters, of an adjustable stationary cylinder disposed within and slidingly contacting the inner surface of the cutting-cylinder, said stationary cylinder having formed through its shell a longitudinal slot adapted to successively register with the longitudinal rows of apertures in the cutting-cylinder, said slot being located opposite a point in the rotation of the cutting-cylinder at which the cut and impressed sheet of dough leaves the latter, and means for creating an air-suction within the fixed cylinder for the removal of scrap through said apertures and said slot, substantially as described.

FRANK M. PETERS.

Witnesses:
SAMUEL N. POND,
FREDERICK C. GOODWIN.